United States Patent [19]
Campbell

[11] 3,952,300
[45] Apr. 20, 1976

[54] SONAR TARGET CONVERTER
[76] Inventor: Donald G. Campbell, 788 W. Washington St., Burns, Oreg. 97720
[22] Filed: June 8, 1962
[21] Appl. No.: 202,354

[52] U.S. Cl. ............................... 343/6 R; 328/55; 328/177; 340/3 R
[51] Int. Cl.² ......................................... G01S 9/02
[58] Field of Search .................... 343/6 R; 340/3 R; 328/55, 177

[56] References Cited
UNITED STATES PATENTS

| | | | |
|---|---|---|---|
| 2,689,083 | 9/1954 | Hammond, Jr. ................... | 343/6 X |
| 3,160,846 | 12/1964 | Gustafson et al. ............... | 343/6 R X |
| 3,183,478 | 5/1965 | Slawsky et al. .................. | 343/6 R X |
| 3,546,666 | 12/1970 | Ziehm et al. ..................... | 343/6 R X |

Primary Examiner—T. H. Tubbesing
Attorney, Agent, or Firm—Richard S. Sciascia; Louis A. Miller; Don D. Doty

EXEMPLARY CLAIM

1. A sonar converter comprising in combination, radar means for echo-ranging on an aircraft target and producing a pair of output signals representing the range and bearing thereof, sonar means for echo-ranging on a submarine target and producing a pair of output signals representing the range and bearing thereof, means coupled to said radar means for displaying said aircraft range and bearing in response to the pair of output signals produced thereby, means coupled to said radar means and said sonar means for generating a signal having a time delay proportional to the range of said submarine target, means coupled to said radar and sonar means for generating a signal representing the bearing of said submarine target when same substantially coincides with the bearing display of said aircraft target, and means connected between the outputs of said time delayed signal generating means and said submarine target bearing signal generating means and the input of the aforesaid aircraft range and bearing display means for simultaneously supplying said submarine target range and bearing signals thereto for display thereof only when said displayed aircraft target bearing and said submarine target bearing are within a predetermined angular display sector.

14 Claims, 6 Drawing Figures

INVENTOR.
DONALD G. CAMPBELL

INVENTOR.
DONALD G. CAMPBELL
BY
ATTORNEYS

SONAR TARGET CONVERTER

The invention described herein may be manufactured and used by or for the Government of the United States of America for governmental purposes without the payment of any royalties thereon or therefor.

The present invention relates generally to echo-ranging systems and in particular is a system which combines the operation of a sonar with a radar in such manner that a sonar target position is displayed on the radar planned position indicator (PPI) in conjunction with the radar display of the position of killer aircraft searching for said sonar target. Such display, of course, facilitates accurate direction of the aircraft over the sonar target to effect its distruction without itself being vulnerable to attack thereby.

In the past, control of aircraft positioning for anti-submarine warfare (ASW) purposes has been attempted by an operator viewing and comparing the range and bearing of an aircraft and its prospective submarine target on the respective PPI oscilloscopes of the consoles of separate radar and sonar systems. While effective during some anti-submarine warfare operations, it has been found to be insufficient for most operations in that the accuracy of such an operational procedure is so poor that it is practically impossible for the control operator to tell when the aircraft is positioned directly over the submarine target or even if it is sufficiently near thereto to make an effective kill with the weapons presently available. This is due to the fact that human visual response, interpretation, and judgment is involved, and the scanning of additional relatively isolated indicia is necessary before said judgment can be made. Moreover, the operational limitations and physical parameters of sonar and radar systems ordinarily seem to compound the possibility of error, since mentally comparing two or more displays of different readout patterns disposed at different physical locations may not lend itself to efficient, accurate, rapid interpretation thereof.

The present invention overcomes many of the disadvantages of the prior art by displaying the radar bearing and range information and the sonar bearing and range information simultaneously on the same display scope, viz, the radar PPI, which, of course, vastly improves the visibility thereof and, thus, makes it easier for the operator to observe it and quickly take the necessary action, accordingly.

It is, therefore, an object of this invention to provide an improved method and means for simultaneously displaying the relative positions of independent sonar and radar targets.

Another object of this invention is to provide an improved method and means for simultaneously displaying the respective positions of an aircract target and a submarine target on a single radar plan position indicator.

Still another object of this invention is to provide a method and means of accurately and simultaneously displaying a sonar target's position and an aircraft's position on a radar display system.

Another object of this invention is to improve the accuracy and visibility of bearing and range information displays at all positions on the readout scope.

Another object of this invention is to provide an improved anti-submarine warfare control system that is not adversely affected by most weather conditions.

Still another object of this invention is to provide new and improved tactics in ASW operations.

A further object of this invention is to provide a sonar target converter that is easily and economically manufactured and maintained.

Other objects and many of the attendant advantages of this invention will be readily appreciated as the same becomes better understood by reference to the following detailed description when considered in conjunction with the accompanying drawings in which like reference numerals designate like parts throughout the figure thereof and wherein.

Figure 1:
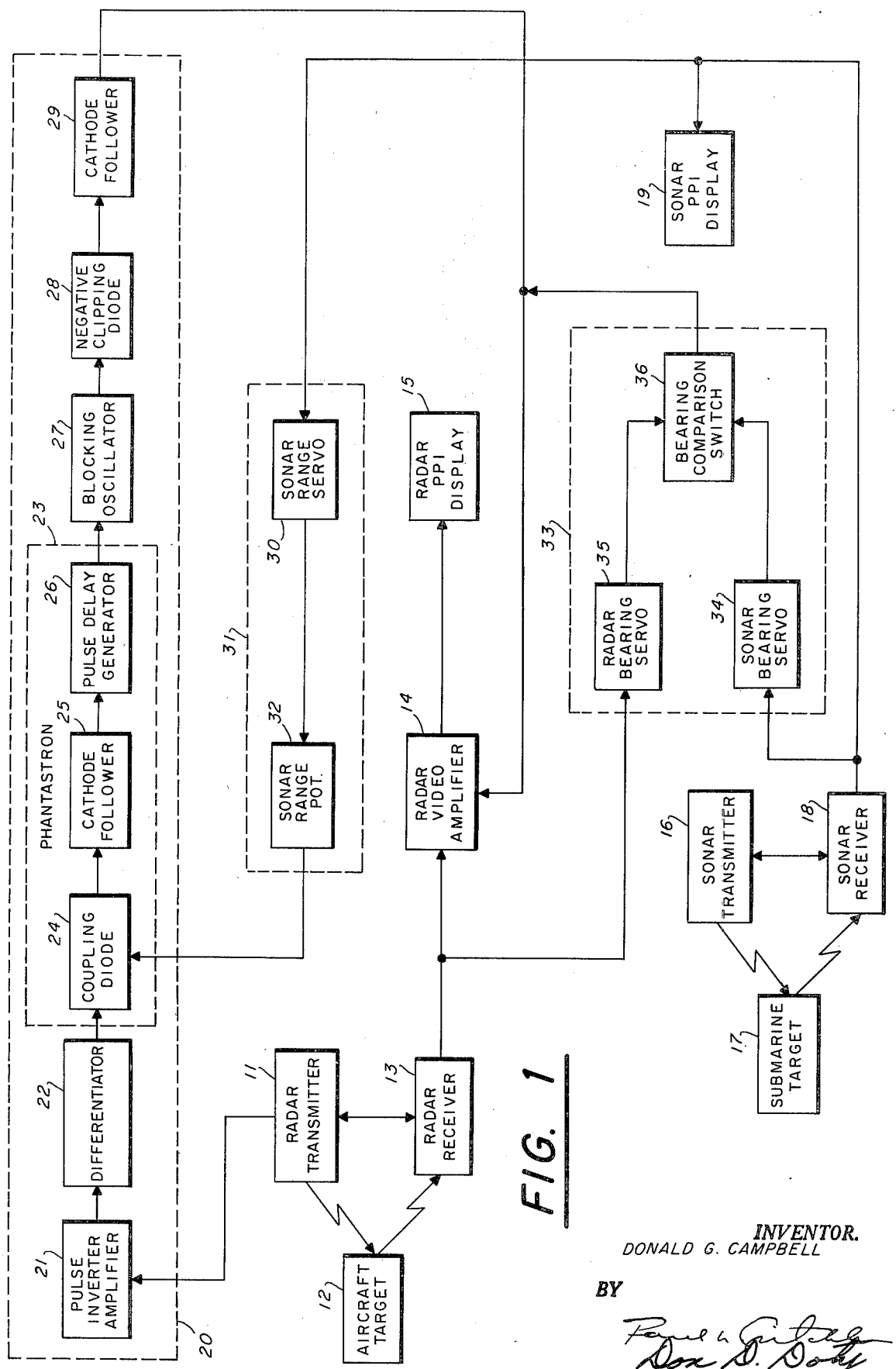
FIG. 1 is a block diagram of a preferred embodiment of the subject sonar target converter system constituting this invention.

Referring now to FIG. 1 of the drawing, there is shown a radar system having a radar transmitter 11 which echo-ranges on an aircraft target 12, such as, for example, a helicopter or any other suitable type aircraft, and a radar receiver 13 adapted for receiving the energy reflected from said aircraft target. The output of radar receiver 13 is applied through a radar video amplifier 14 to a radar plan position indicator (PPI) display 15, either one or both of which may be located in a remote console, not shown. If so desired, said display may also include other repeater PPI oscilloscopes at other remote locations for the monitoring thereof by any number of interested parties.

A sonar system is also shown as having a sonar transmitter 16 which echo-ranges within an aqueous medium on a submarine target 17, such as, for example, a submarine boat, torpedo, mine or any other object, and a sonar receiver 18 adapted for receiving the energy reflected from said submarine target. Said sonar system may also have its own PPI display system 19 coupled to the output of sonar receiver 18 and it also may obviously be physically disposed in one or more locations as required for the proper monitoring thereof.

Figure 2:
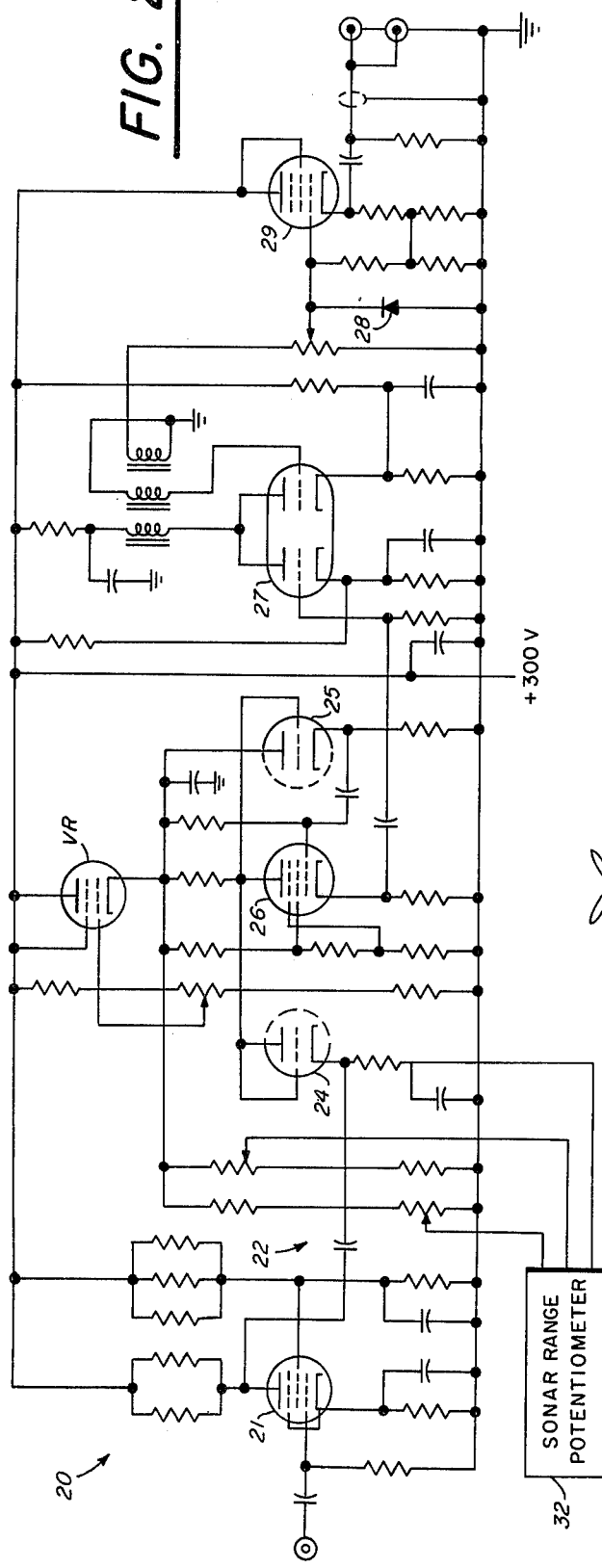
FIG. 2 is a detailed schematic diagram of the sonar target converter pulse generator disclosed in block diagram form in FIG. 1.

FIG. 1 and FIG. 2 each depict a sonar target converter pulse generator 20 consisting of a pulse inverter amplifier 21, the input of which is received from a sync pulse output from radar transmitter 11. The output is applied through a differentiator 22 to a phantastron 23 containing a coupling diode 24 with the output thereof fed through a circuit isolation cathode follower 25 to a pulse delay generator 26. If so desired, the plate voltage for said phantastron components may be controlled by a voltage regulator tube VR. The output of pulse delay generator 26, of course, constitutes the output from phantastron 23 and is fed through a blocking oscillator 27, a negative clipping diode 28, and another circuit isolation cathode follower 29 before being applied as the output from sonar target converter pulse generator 20 as the sonar video signal to one of the inputs of the aforesaid radar video amplifier 14.

Said sonar video signals, of course, effectively originate at sonar receiver 18. The output of sonar receiver 18 is applied to a sonar range servo 30 of a sonar range adjust system 31. The output of sonar range servo 30 mechanically adjusts the sonar range potentiometer 32 having substantially linear voltage characteristics in accordance with the range of the sonar target which, in turn, timely supplies a delayed signal proportional to and representing said sonar target range to one of the inputs of coupling diode 24 of phanastron 23.

A sonar-radar bearing comparison system 33 receives its bearing information input signals from both of the aforementioned sonar receiver 18 and radar receiver 13. The outputs therefrom are respectively applied to the input of sonar bearing servo 34 and radar bearing servo 35 which, in turn, mechanically connect to a bearing comparison switch mechanism 36 for appropriately and timely effecting bearing information display of both of the aforementioned sonar and radar targets on radar PPI display, as will be more fully explained subsequently. To effect this, the output of bearing comparison switch 36 is applied to the same input of radar video amplifier 14 as the output from cathode follower 29 of targer converter pulse generator 20.

Figure 3:
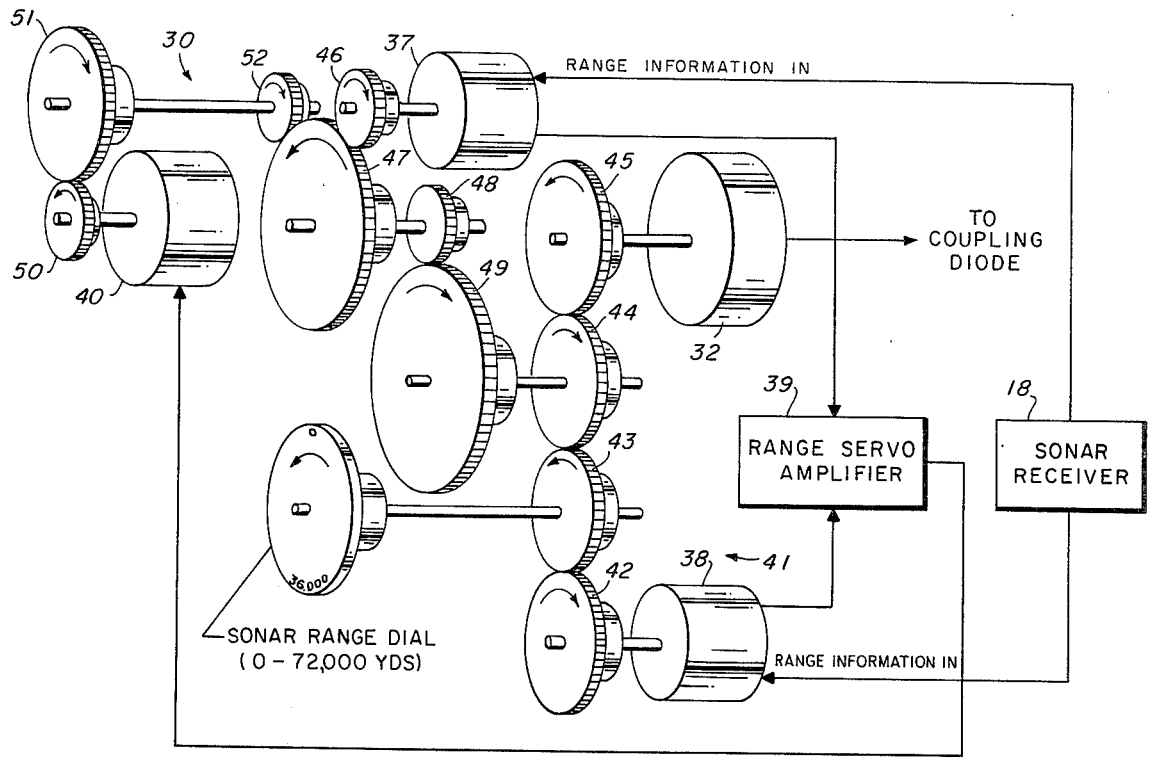
FIG. 3 is a combination mechanical and electrical diagram of the sonar range servo system of FIG. 1.
Figure 6:
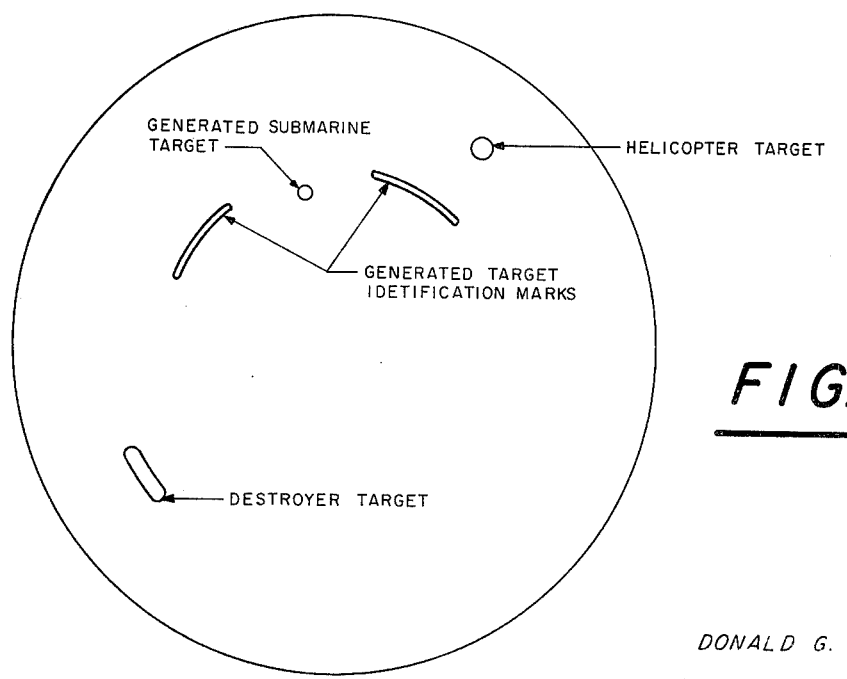
FIG. 6 is a diagrammatical-pictorial representation of the oscilloscope face of the radar PPI display illustrating the operational method and means of using the subject invention.

Referring now to FIG. 3, a more detailed view of the aforesaid sonar range servo system is shown as receiving sonar range information from sonar receiver 18. This information is applied as an electrical signal to a 36 speed synchro 37 and a one speed synchro 38, respectively. Synchros 37 and 38 each supply an electrical signal through a range servo amplifier 39 to a null-balance reversible motor 40.

Each of said synchros, said null-balance motor, as well as the aforementioned sonar range potentiometer, are mechanically interconnected by an appropriate gear train 41. Said gear train may, for instance, include gears 42, 43, 44, and 45 between synchro 38 and sonar range potentiometer 32; gears 46, 47, 48, 49, 44, and 45 between synchro 37 and sonar range potentiometer 32; and gears 50, 51, 52 and 47, and so forth between sonar range null-balance motor 40 and synchros 37 and 38. As previously mentioned in connection with the description of FIG. 1, the electrical output of sonar range potentiometer 32 is applied to coupling diode 24 of phantastron 23 to ultimately effect the proper delay of the sonar range video signals.

Figure 4:
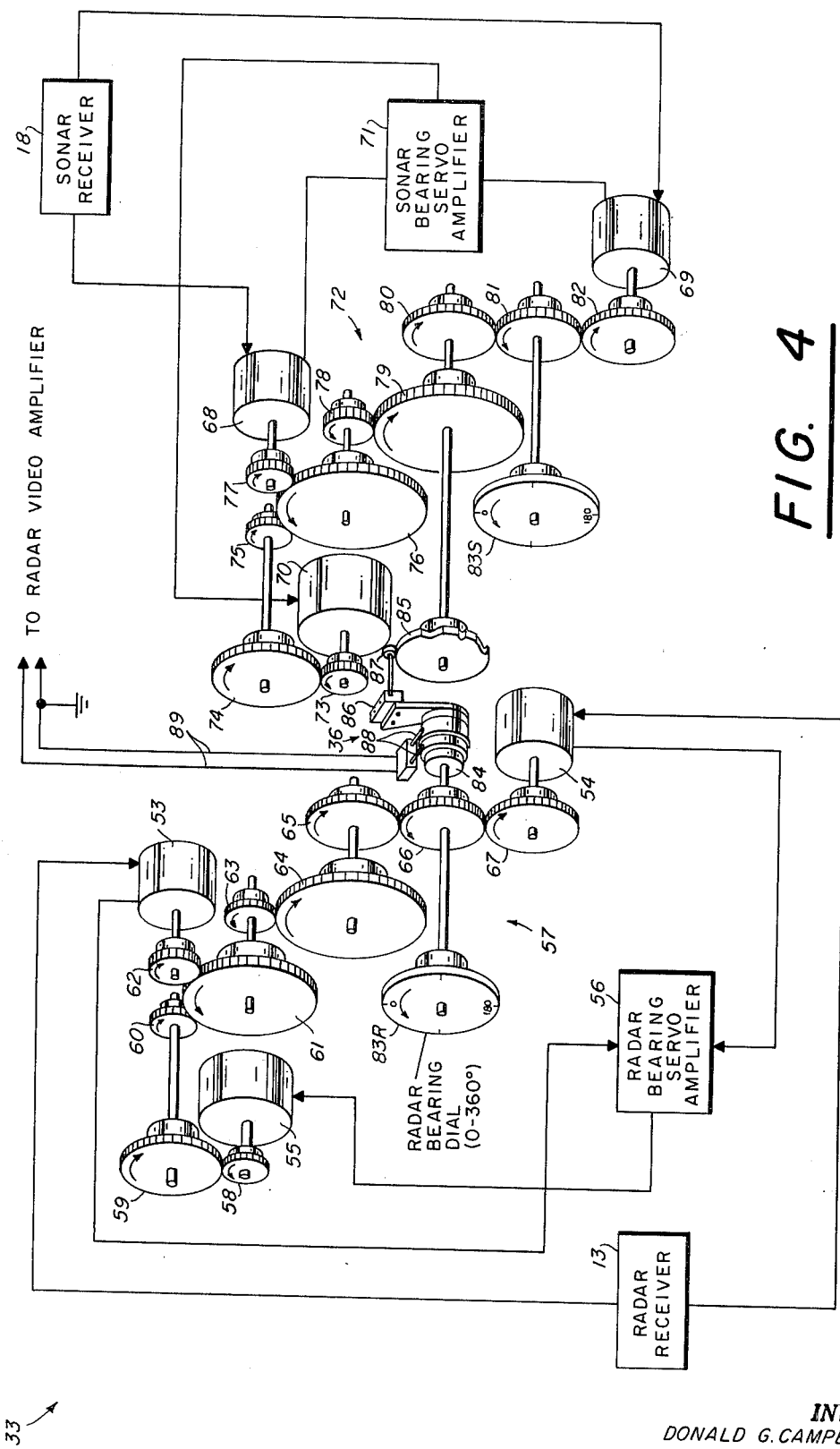
FIG. 4 is a combination mechanical and electrical diagram of the sonar-radar bearing servo and comparison system of FIG. 1.

FIG. 4 depicts the aforementioned sonar-radar bearing comparison system 33 in mechanical and electrical schematic form in combination with block representations of radar receiver 13 and sonar receiver 18. A pair of radar bearing information signals are respectively applied to a 36 speed synchro 53 and a one speed synchro 54. Electrical outputs from synchros 53 and 54 are effectively applied to radar bearing null-balance motor 55 through a radar bearing servo amplifier 56. Said synchro 53 and 54 and motor 55 as well as the aforementioned bearing comparison switch mechanism 36 are interconnected by a gear train 57. Said gear train 57 may, for example, consist of gears 58 through 67 and their respective shafts to provide the desired mechanical drive ratios therebetween.

Likewise, a pair of sonar bearing information signals which may, for example, be obtained from the cursor sonar portion of sonar receiver 18 are respectively applied to a 36 speed synchro 68 and a one-speed synchro 69. Electrical outputs from synchros 68 and 69 are effectively applied to sonar bearing null-balance reversible motor 70 through a sonar bearing servo amplifier 71. Said synchros 68 and 69 as well as null-balance motor 70 are interconnected by an appropriate gear train 72. Said gear train may, for example, consist of gears 73 through 82 and their respective shafts to provide the desired mechanical drive ratios therebetween.

Connected to the shaft gear 66 for rotation therewith is a radar bearing indicator dial 83R and a pair of slip rings 84 of switch 36. Connected to the shaft of gear 81 is a sonar bearing indicator dial 83S, and connected to the shaft of gear 79 for rotation therewith is a notched cam 85. A microswitch 86 has a cam follower 87 which rides on the periphery of cam 85 and is attached for rotation with slip rings 84. As can readily be seen, the notches of cam 85 properly actuate cam follower 87 to timely open and close microswitch 86. Slip rings 84 have a pair of sliders 88 riding thereon which are electrically connected in series with microswitch 86 and to radar video amplifier 14 through leads 89.

All of the foregoing elements shown in block or schematic form whether they be electrical or mechanical in character are well known and conventional in the art per se unless otherwise so stated and specifically described, and it is their unique arrangement, interconnection, and interaction, that constitutes this invention.

Briefly, the operation of the subject invention is herewith discussed in conjunction with FIGS. 1 through 6.

Figure 5:
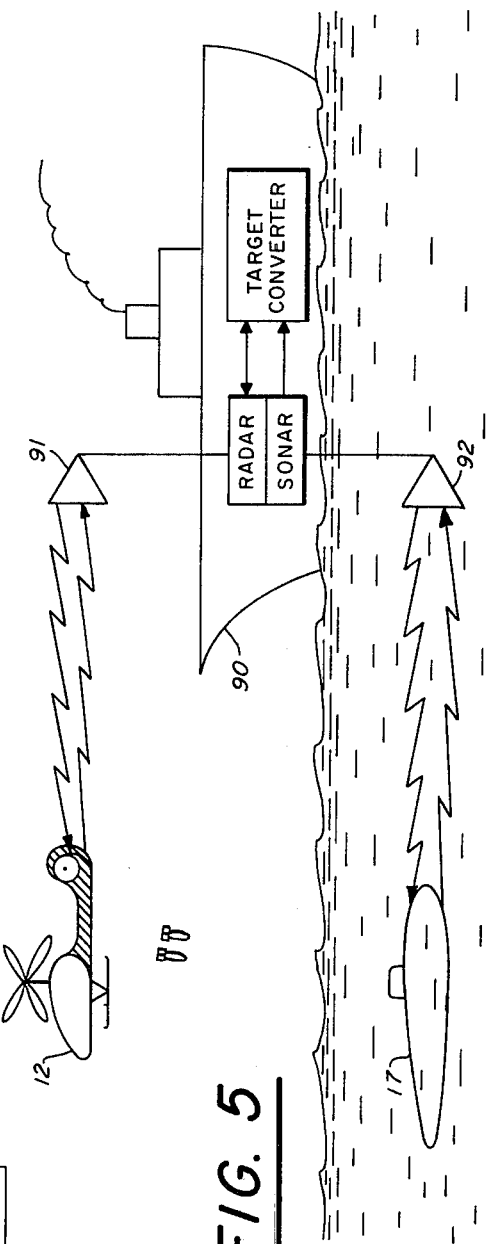
FIG. 5 is a pictorial representation of an exemplary tactical submarine target destruction maneuver incorporating the sonar target converter of this invention.

During anti-submarine warfare, weapon delivery has followed a trend toward stand-off ranges. Modern destroyers are now equipped with torpedo carrying helicopters and long range torpedos. Other ships having higher performance sonars may also operate in concert with other types of aircraft capable of delivering torpedos or other weapon means to the intended target for destruction thereof. In either event, the problem of locating a target submarine boat and simultaneously directing an aircraft to a position over it for kill purposes exists. If, for instance, a ship 90, as shown in FIG. 5, locates submarine target 17 by means of its sonar, it may direct aircraft 12 over it with considerable accuracy by tracking both the directed aircraft and the submarine target with its radar and sonar antenna 91 and transducer 92, respectively, when modified to incorporate the subject sonar converter. Radio or other communication may then be readily used either manually or automatically as desired to direct the killer aircraft over the submarine target for distruction thereof by dropping or otherwise using the most suitable weapons therefor.

The subject sonar target converter makes the foregoing tactical maneuver possible because it generates a video symbol representing the sonar target at the proper range and bearing suitable for mixing with search radar video display with the same acting as the reference display. This is effected by producing a pulse that is delayed in time from the radar zero time trigger an amount proportional to sonar target range. This pulse is then applied to the radar display in such manner that it presents a distinctive video symbol centered on sonar target bearing, as exemplarily illustrated in the console oscilloscope display of FIG. 6, whenever the bearing of radar antenna 90 is coincident with the bearing of sonar target 17 or is displaced a predetermined angular distance such as 15° therefrom, depending on the design notch locations on cam 85.

Specifically, the range information output from the sonar receiver 18 is supplied to a sonar range servo 30 which, in turn, mechanically adjusts sonar range potentiometer 32 so that the difference in radar and sonar propagation velocity is compensated for and a delayed pulse corresponding thereto is generated. FIG. 3 shows the preferred embodiment of the sonar range adjust system 31 which performs this function to increase accuracy, 36-to-1 speed synchros are employed in combination with appropriate servo amplifier and a reversible motor to properly position the shaft of sonar range potentiometer 32 so that said sonar-radar propagation velocity compensation signal is generated. Because null balance operational principles are preferred and used to effect positive positioning of sonar range potentiometer 32, the gear train and other previously mentioned components associated therewith are preferably of precision quality and are employed as illustrated; however, it should be understood that any other pertinent arrangement that performs the stated desired function may be used if preferred.

A radar sync trigger is additionally supplied to pulse inverter amplifier 21 from radar transmitter 11, and this trigger, as previously mentioned, represents zero radar range. This trigger is amplified and inverted therein, then differentiated in differentiator 22, shaped and isolated, respectively by coupling diode 24 and cathode follower 25, and appropriately delayed by delay pulse generator 26. Although shown in some detail, the aforesaid coupling diode 24, cathode follower 25 and pulse delay generator 26 are all well known components of a conventional phantastron 23. The amount of delay of said radar sync trigger is actually determined by the setting of the voltage supplied by sonar range potentiometer 32 which, of course, is proportional to the position of the shaft thereof which, in turn, is adjusted by sonar range servo unit 30. The output of pulse delay generator 26 is then coupled to blocking oscillator 27 where a pulse of fixed duration and amplitude is generated and coupled to diode 28 for clipping of the negative pulse portion therefrom before being applied to cathode follower 29, the output circuit isolation element of converter pulse generator 20.

The resulting output pulse from converter pulse generator 20 is the delayed pulse that is applied to radar video amplifier 14 for ultimately positioning the sonar target indication at the proper range on the radar PPI display 15.

The bearing display of both the sonar and radar targets on the radar PPI is effected by bearing comparison system 33 which includes sonar bearing servo 34, radar bearing servo 35 and bearing comparison switch 36. Actually, radar antenna bearing and radar target display bearing signals are supplied by radar receiver 13 to radar bearing servo 35, and sonar target bearing information signals are supplied by sonar bearing servo 34. These servos, in turn, position cam follower 87 of microswitch 86 and notched cam 85, respectively, as is shown in mechanical schematic detail in FIG. 4. Said cam is notched at a 2° center sector and two 30° sectors on each side of two respective 15° sectors from the center 2° notch. The 2° notch is so positioned as to represent sonar target bearing and the two 30° sectors are intended to facilitate finding and observing the sonar target that is pertinent and of interest at any given moment even though it may be close to or in the midst of a plurality of other sonar targets. Slip rings 84 and their sliders 88 are used to allow the proper rotation and positioning, regardless of what it may be, of cam follower 87 by the radar bearing servo and still provide electrical continuity through the series circuit consisting of same, so that radar video amplifier 14 will be timely energized and de-energized to display the range and bearing of the sonar target on the radar PPI. In actual practice, said micro-switch-cam assembly operates to open the short circuit of the sonar range video pulse during the period the cam follower rides the notched portion of the cam. Thus, it can be seen that a sonar range target pulse will be displayed when the radar antenna or target bearing display is coincident with the sonar target bearing and for a 30° sector on either side thereof when the radar antenna or target bearing display is displaced more than 15° from the sonar target bearing. Although this particular display pattern has been selected as being optimum under present existing operational conditions, the design and placement of the aforementioned notches of cam 85 may be such as to produce any preferred display of the sonar target on the radar PPI display.

Schematic details of the sonar-radar bearing comparison system 33 which performs this operation is depicted in FIG. 4. Like in the aforementioned sonar range servo system, to ensure accuracy, 36-to-1 speed synchros are again employed in combination with servo amplifiers, appropriate gear trains, and a reversible gear motor to properly position both the cam and cam follower of the bearing comparison switch. Because null-balance operational principles are also used to effect positive positioning of both said cam and cam follower elements, the gear trains and other components respectively associated therewith are preferred as shown in the embodiment of FIG. 4; however, it should be understood that any other arrangement that performs the desired function may be employed without violating the spirit and scope of the invention, since so doing would obviously be well within the purview of the skilled artisan.

Although the foregoing disclosure teaches the use of radar and sonar sets as the preferred means for locating the aircraft and submarine targets, respectively, it should be understood that any desired target search and tracking means which provides target range and bearing information in synchro or analog voltage form, such as, for example, a fire control system, may be employed and substituted therefor in combination with the subject sonar target converter without violating the spirit and scope of this invention.

Obviously, many modifications and variations of the present invention are possible in the light of the above teachings. It is therefore to be understood that within the scope of the appended claims, the invention may be practiced otherwise than as specifically described.

What is claimed is:

1. A sonar converter comprising in combination, radar means for echo-ranging on an aircraft target and producing a pair of output signals representing the range and bearing thereof, sonar means for echo-ranging on a submarine target and producing a pair of output signals representing the range and bearing thereof, means coupled to said radar means for displaying said aircraft range and bearing in response to the pair of output signals produced thereby, means coupled to said radar means and said sonar means for generating a signal having a time delay proportional to the range of said submarine target, means coupled to said radar and sonar means for generating a signal representing the bearing of said submarine target when same substantially coincides with the bearing display of said aircraft target, and means connected between the outputs of said time delayed signal generating means and said submarine target bearing signal generating means and the input of the aforesaid aircraft range and bearing display means for simultaneously supplying said submarine target range and bearing signals thereto for display thereof only when said displayed aircraft target bearing and said submarine target bearing are within a predetermined angular display sector.

2. The device of claim 1 wherein said radar means for echo-ranging on an aircraft target comprises a transmitter and a receiver connected thereto.

3. The device of claim 1 wherein said sonar means for echo-ranging on a submarine target comprises a transmitter and a receiver connected thereto.

4. The device of claim 1 wherein said means coupled to said radar means for displaying said aircraft range and bearing in response to the pair of output signals produced thereby is a console PPI oscilloscope.

5. Means for simultaneously displaying the range and bearing of an aircraft target and a submarine target when they are in substantially vertical alignment comprising in combination, a radar, a radar display effectively coupled to the output of said radar, said radar display having a zero reference scanning time and a predetermined scanning rate measured therefrom, a sonar, means connected to the outputs of said radar and said sonar for comparing the bearings of said aircraft and submarine targets and producing a signal representative thereof when same are within predetermined relative angular sectors measured in a substantially horizontal plane, means coupled to the output of said sonar for generating a voltage proportional to the range of said submarine target, a sonar target pulse generator connected to said radar and said voltage generating means for producing a signal that is delayed in time from the aforesaid display zero reference scanning time an amount proportional to said voltage, and means coupled to the interconnection of the output of said delayed signal producing means and said aircraft and submarine bearing comparing means and the input of said radar display for supplying said delayed signal and said compared bearing representative signal thereto simultaneously.

6. The device of claim 5 wherein said means connected to the outputs of said radar and said sonar for comparing the bearings of said aircraft and submarine targets and producing a signal representative thereof when same are within predetermined relative angular sectors measured in a substantially horizontal plane comprises a radar bearing servo coupled to the output of said radar, a sonar bearing servo coupled to the output of said sonar, and a bearing comparison switch connected to the outputs of said radar and sonar bearing servos.

7. The device of claim 5 wherein said means coupled to the output of said sonar for generating a voltage proportional to the range of said submarine target comprises a sonar range servo and a sonar range potentiometer connected thereto.

8. The device of claim 5 wherein said sonar target pulse generator connected to said radar and said voltage generating means for producing a signal that is delayed in time from the aforesaid display zero reference scanning time an amount proportional to said voltage comprises a pulse inverter amplifier, a differentiator coupled to the output of said pulse inverter amplifier, a phantastron connected to the output of said differentiator, a blocking oscillator connected to the output of said phantastron, a negative clipping diode coupled to the output of said blocking oscillator, and a cathode follower coupled to the output of the aforesaid negative clipping diode.

9. The device of claim 5 wherein said means coupled to the interconnection of the output of said delayed signal producing means and said aircraft and submarine bearing comparing means and the input of said radar display for supplying said delayed signal and said compared bearing representative signal thereto simultaneously comprises a radar video amplifier.

10. Means for displaying the range and bearing of a pair of targets having different elevational levels on the same PPI display comprising in combination, a first echo-ranging system, a PPI display having a zero reference time and a predetermined scanning rate connected to said first echo-ranging system, a second echo-ranging system, means connected to the outputs of said first and second echo-ranging systems for comparing the bearings of said pair of targets and producing an output signal representative thereof when same are within predetermined relative angular sectors measured in a substantially horizontal plane, means coupled to said second echo-ranging system for generating a voltage that is proportional to the range of one of said pair of targets, means coupled to said first echo-ranging system and said voltage generating means for generating a signal that is delayed in time from the aforesaid display zero reference time in accordance with said voltage, and means connected to the interconnection of the output of said delayed signal producing means and said target bearing comparison means and the input of said PPI display for supplying said delayed signal and said compared representative signal thereto simultaneously for display thereof thereby.

11. A variable pulse delay generator for delaying a predetermined pulse signal an amount porportional to a voltage within a predetermined voltage range comprising in combination, a pulse inverter amplifier adapted to receive the pulse signal to be delayed, a differentiator coupled to the output of said pulse inverter amplifier, a phantastron connected to the output of said differentiator, and a blocking oscillator coupled to the output of said phantastron.

12. The device of claim 11 further characterized by a negative clipper coupled to the output of said blocking oscillator and a cathode follower connected to the output of said negative clipper.

13. The device of claim 11 wherein said phantastron includes a coupling diode, a cathode follower coupled to the output of said coupling diode, and a pulse delay generator connected to the output of said cathode follower.

14. A method of simultaneously displaying the range and bearing of an aircraft target and a submarine target on a radar PPI display comprising the steps of transmitting electromagnetic energy toward an aircraft target, receiving the electromagnetic energy reflected from said aircraft target and converting it to signals representing the range and bearing thereof, transmitting acoustical energy toward a submarine target, receiving the acoustical energy reflected from said submarine target and converting it to signals representing the range and bearing thereof, generating a signal delayed in time from the time of transmission of said electromagnetic energy by an amount proportional to the range of said sonar target, comparing the bearings of said radar and sonar targets, producing a signal representing same when both are in coincidence, and timely displaying said time delayed signal and said radar-sonar bearing signal simultaneously with the aforesaid representative aircraft target range and bearing signals in terms of the relative positions of said submarine and aircraft targets respectively.

* * * * *